(12) United States Patent
Fabre

(10) Patent No.: US 8,801,385 B2
(45) Date of Patent: Aug. 12, 2014

(54) VIBRATION DAMPER DEVICE FOR TURBOMACHINE BLADE ATTACHMENTS, ASSOCIATED TURBOMACHINE AND ASSOCIATED ENGINES

(75) Inventor: Adrien Jacques Philippe Fabre, Montrouge (FR)

(73) Assignee: SNECMA, Paris (FR)

( * ) Notice: Subject to any disclaimer, the term of this patent is extended or adjusted under 35 U.S.C. 154(b) by 556 days.

(21) Appl. No.: 13/057,905

(22) PCT Filed: Aug. 5, 2009

(86) PCT No.: PCT/EP2009/060165
§ 371 (c)(1),
(2), (4) Date: May 3, 2011

(87) PCT Pub. No.: WO2010/015660
PCT Pub. Date: Feb. 11, 2010

(65) Prior Publication Data
US 2011/0206530 A1 Aug. 25, 2011

(30) Foreign Application Priority Data
Aug. 6, 2008 (FR) ...................... 08 55448

(51) Int. Cl.
*F01D 5/26* (2006.01)
(52) U.S. Cl.
USPC ......................................... 416/221; 416/500
(58) Field of Classification Search
CPC ........... F01D 5/10; F01D 5/26; F01D 5/3092; F01D 25/04; F01D 25/06
USPC .............. 416/248, 500, 219 R, 220 R, 219 A, 416/220 A, 244 A, 221
See application file for complete search history.

(56) References Cited

U.S. PATENT DOCUMENTS

| | | | |
|---|---|---|---|
| 5,240,375 A | 8/1993 | Wayte | |
| 6,102,664 A | 8/2000 | Nguyen | |
| 2002/0044870 A1 | 4/2002 | Simonetti et al. | |
| 2009/0060745 A1 * | 3/2009 | Douguet et al. | .......... 416/219 R |

FOREIGN PATENT DOCUMENTS

JP 02196105 A * 8/1990

OTHER PUBLICATIONS

JP 02-196105 A Translation. FLS, Inc. Washington D.C. Sep. 2013. 9 pages.*
International Search Report issued Aug. 31, 2009 in PCT/EP09/060165 filed Aug. 5, 2009.

* cited by examiner

*Primary Examiner* — Richard Edgar
(74) *Attorney, Agent, or Firm* — Oblon, Spivak, McClelland, Maier & Neustadt, L.L.P.

(57) ABSTRACT

A vibration-damping device for a turbomachine blade including a blade root configured to be inserted into a pocket of a carrier disk of a bladed wheel, the device configured to be positioned between the blade root and a retaining wall of the pocket. The device includes at least one shim including an assembly of layers of rigid materials and of viscoelastic materials, and including two portions, each forming a lateral branch which can be inserted along one of the two retaining walls, the two lateral branches being connected to one another, so as to constitute a single part, by a third portion forming a shim bottom of rigid material. At least one layer of viscoelastic material is positioned between two layers of rigid materials.

9 Claims, 4 Drawing Sheets

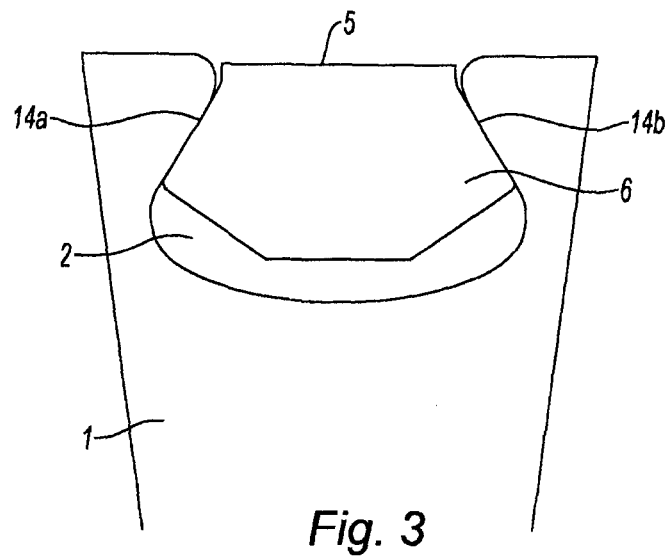
Fig. 3
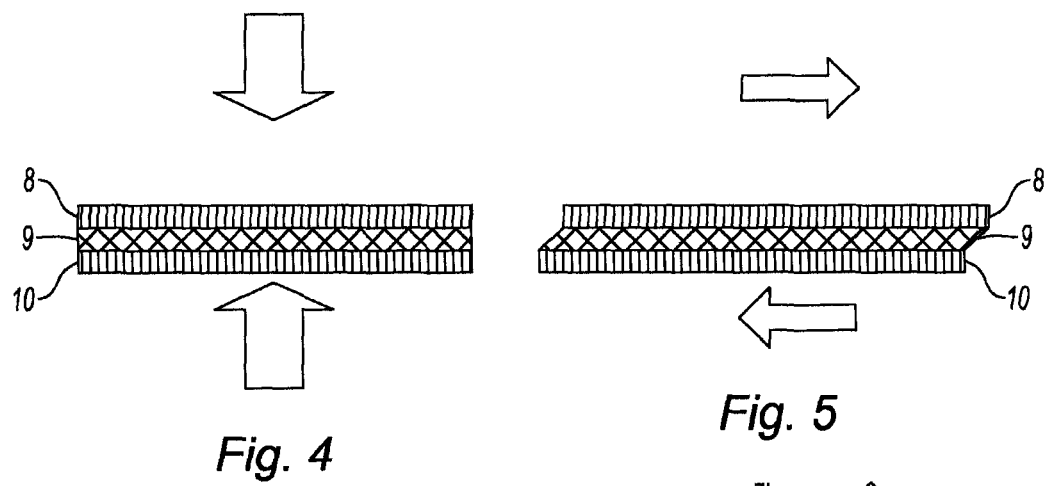
Fig. 4
Fig. 5
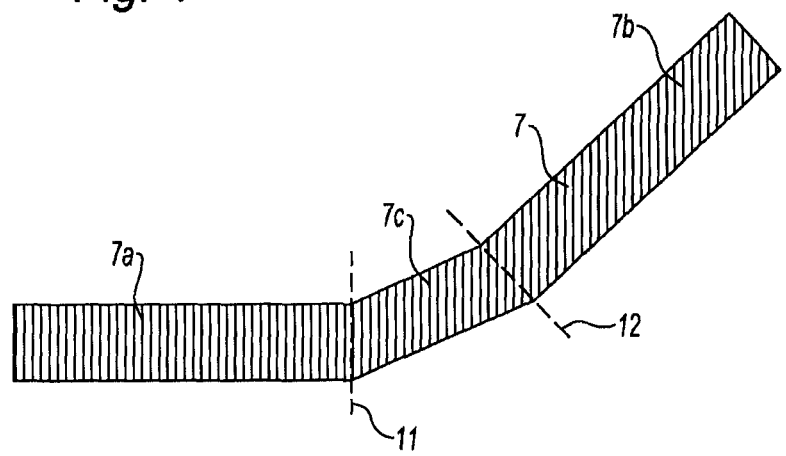
Fig. 6

VIBRATION DAMPER DEVICE FOR TURBOMACHINE BLADE ATTACHMENTS, ASSOCIATED TURBOMACHINE AND ASSOCIATED ENGINES

BACKGROUND OF THE INVENTION

1. Field of the Invention

The present invention relates to the field of turbomachines and, in particular, to that of gas turbine engines, such as turbojet engines, turboprop engines or engines with high speed fans (also known as "propfans"). It is aimed at a vibration damping device for the blade attachments of these engines.

2. Description of the Related Art

Aeronautical turbomachines are made up of a plurality of bladed rotors, that is to say of rotary disks to the peripheries of which moving blades are attached. These bladed rotors are particularly sensitive components because in terms of their design they have to meet requirements of mechanical integrity when rotating and when under aerodynamic load. All of these aspects mean that these structures are statically loaded and, given the life requirements, the amplitudes of vibrations that they experience need to remain small.

The design and development of a turbomachine involves coordinating several disciplines which means that the design process is an iterative one. Vibrational design is carried out in order to avoid the presence of critical modes in the operating range. The whole is validated at the end of the design cycle through an engine test in which vibrational amplitudes are measured. Sometimes high induced levels arise either as a result of synchronous or asynchronous forced responses or as a result of instabilities. The design has then to be reviewed, this being a process which is particularly lengthy and expensive.

The objective from an industrial standpoint is therefore to predict, as early on as possible in the design cycle, what the levels of vibrational response of the structures will be so that the required corrective measures can be taken as early on as possible in the design process. Mechanical damping, which is included in this category, is an important aspect for the designers to address.

The damping of compressor airfoils is a special problem that needs careful attention because these airfoils are particularly sensitive to vibrational phenomena, especially when their length is great. This problem is therefore particularly acute in respect of the airfoils of the first stage of the low-pressure compressor, whether this is a turboprop stage, the bladed rotor of which is not ducted, a bypass turbojet stage, the rotor or "fan" of which is ducted, or even an unducted rotor of a propfan engine.

It is also particularly tricky in the case of propfan engines because, on the one hand, these airfoils are twice as slender as the current airfoils used in a fan and therefore more sensitive to phenomena of flutter and, also, the fact that there are two rows of contrarotating fans produces significant forced excitation stresses on account of the wake effect that the first fan has on the second. Coupling between the vibration modes of the two rows of contrarotating fans through the structure that supports them and which may prove destructive to the engine are also sometimes encountered. In addition, propfans, unlike ducted fans, are sensitive to loadings known as 1P loadings which arise when the engine adopts an angle of incidence, notably when the airplane turns on takeoff. During these phases, the airfoil of a propfan does not experience an even angle of incidence of the air stream as this varies according to its angular position and is therefore subjected to specific excitation synchronous with the speed of the engine.

The airfoils are conventionally attached to the compressor disk by assemblies of the pinned attachment type, that is to say by open cavities into which bulbs that form the blade roots are slid. These cavities are cut into the disk and have retaining walls against which the corresponding faces of the blade root bear.

Devices for reducing blade vibrations have been designed, one example being the one described in NASA U.S. Pat. No. 6,102,664, and which involves bonding a viscoelastic material onto those faces of the blade root that are in contact with the retaining walls of the cavities in the disk. This technique has the disadvantage of requiring a modification to the method of manufacture of the fan or propfan blades and of not being suited to retrofitting to existing blades. It also has the disadvantage that the entire blade has to be changed if there is deterioration of the damping device, unlike a configuration in which the damping device is separate from the blade as proposed here.

Another technique from the prior art involves inserting a shim between the surface of the cavity and that of the blade root bulb. Such a shim, described in General Electric Company U.S. Pat. No. 5,240,375, takes the form of several metal layers assembled as a sandwich, with a layer of austenitic steel sandwiched between two layers of phosphor bronze that have a low coefficient of friction. However, it is aimed at avoiding wear of contacting components and has no appreciable impact on the ability of the airfoils to withstand vibrational stresses.

The applicant company's patent EP 2014873 describes a shim with rigid layers alternating with layers made of an elastic material.

BRIEF DESCRIPTION OF THE INVENTION

It is an object of the present invention to improve the vibration damping of the blades of airplane engines which are held on their disk by means of pinned attachments.

To this end, the subject of the invention is a vibration damping device for a turbomachine blade equipped with an airfoil and with a blade root able to be inserted in a cavity in a disk supporting a bladed rotor, said device being able to be positioned between said blade root and a wall of said retaining cavity, at the region of contact that occurs in operation between the blade root and the cavity, said device comprising at least one shim consisting of assembly of layers of rigid materials and of viscoelastic materials, at least one layer of viscoelastic material being positioned between two layers of rigid materials, the shim comprising two parts, each one forming a lateral branch that can be inserted along one of the two retaining walls, the two lateral branches being joined together, in such a way as to form a single component, by a third part of rigid material that forms the shim bottom, characterized in that said shim bottom is positioned, relative to the lateral branches, in such a way that after fitting it lies at the upstream or downstream end of the blade root.

Inserting a layered shim comprising at least one layer of viscoelastic material and two layers of rigid materials makes it possible, through the dissipation of energy that it generates, to increase the vibration damping of the blades. This makes it possible to shift the vibration modes of the blades toward lower frequencies and thus push them below the idle speed of the engine. Positioning the part that forms the shim bottom upstream or downstream of the blade root makes it possible to guarantee that the lateral branches will be positioned optimally in contact with the retaining walls, without any interference that might be created by contact between the shim bottom and the bottom of the cavity or even the blade root. This then ensures that the relative displacements of the layers that make up the lateral walls will not be disturbed and that, in this way, these walls will fully perform their damping function.

According to preferred embodiments:

the shim consists of an assembly of an odd number of layers greater than 3, the layers of viscoelastic materials alternately succeeding the layers of rigid materials and the outermost layers are made of rigid materials.

the characteristics of the viscoelastic material vary from one layer to another.

the characteristics of the rigid material vary from one layer to another.

the shim bottom forms a single piece with one of the layers of rigid materials of the lateral branches.

the shim is obtained from a flat component consisting of three consecutive segments separated from one another by fold lines, the segment that forms the shim bottom being positioned between the two segments that form the lateral branches.

Another subject of the invention is a turbomachine comprising at least one disk supporting a bladed rotor, the blades of which are inserted in the cavities of the disk through the insertion of a vibration damping device described hereinabove.

According to preferred embodiments:

the disk of the fan stage of a gas turbine engine provided with a fan is equipped with a vibration damping device described hereinabove.

the disk of at least one of the stages that carries unducted fans of a propfan engine is equipped with a vibration damping device described hereinabove.

BRIEF DESCRIPTION OF THE SEVERAL VIEWS OF THE DRAWINGS

Other features and advantages will become apparent from the following description of various exemplary embodiments of the invention, with reference to the attached drawings.

In these drawings,

FIG. 3 is a view in cross section of the device for holding a blade in a cavity of a disk according to the prior art, FIG. 4 is a view in cross section of the materials that make up a shim according to one embodiment of the invention, subjected to compressive stress, FIG. 5 is a view in cross section of the materials that make up a shim according to one embodiment of the invention, subjected to shear stress, FIG. 6 is a plan view of a shim according to one embodiment of the invention before it has been bent into shape, FIGS. 7 and 8 respectively are a front view and a view in cross section from above of a shim according to one embodiment of the invention, after it has been bent into shape.

DETAILED DESCRIPTION OF THE INVENTION

Figure 1:
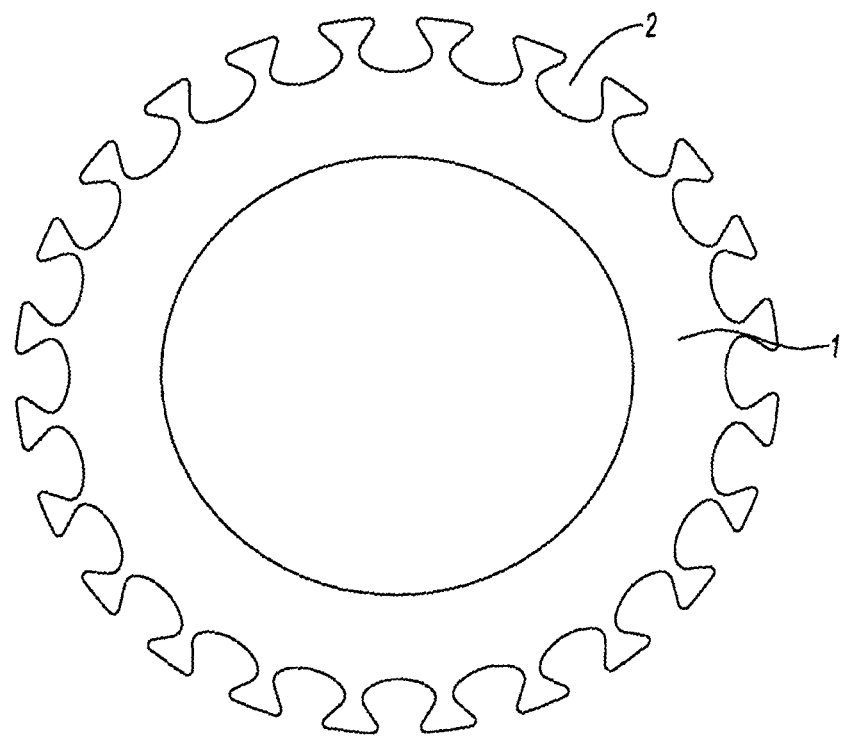
FIG. 1 is a view in cross section of a compressor disk that uses the pinned attachment technology.
Figure 2:
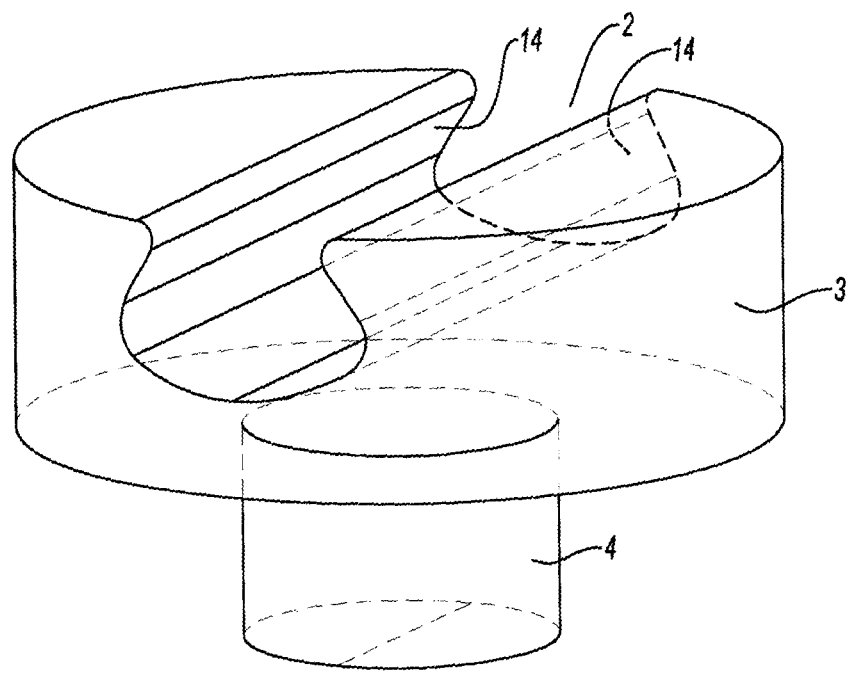
FIG. 2 is a perspective view of a cavity in the case of a variable-pitch fan blade.

Reference is made to FIG. 1 which shows a compressor disk 1 for a turbomachine, the periphery of which is cut with cavities 2 which are evenly distributed around the entire circumference. FIG. 2 shows a pinned attachment for a variable-pitch engine; the cavity 2 is cut from a cylindrical component 3 which terminates at its lower end in a pivot 4 held by the disk 1 and mounted with the ability to rotate freely. The cavity 2 is open radially toward the outside to allow the blade to enter and has two retaining walls 14 intended to retain the blade when the engine is running. FIG. 3 shows the root 6 of a blade 5, in the form of a bulb or dovetail, which is inserted in a cavity 2 of a segment of the disk 1.

Reference is now made to FIG. 4 which shows a layered material intended to form a shim 7 that can be inserted between the root 6 of a compressor blade 5 and the retaining walls 14a and 14b of the cavity 2 of the corresponding disk 1. In the example depicted, the layered material is made up of three stacked layers, fixed together, which are produced, in the case of the two outermost layers 8 and 10, from rigid materials, such as metallic materials for example, and in the case of the intermediate layer 9, from a viscoelastic material.

Viscoelasticity is the property of a solid or of a liquid which, when deformed, exhibits a behavior which is both viscous and elastic through simultaneous dissipation and storage of mechanical energy.

The isotropic or anisotropic elastic properties of the rigid material are chosen to be greater than the isotropic or anisotropic properties of the viscoelastic material in the desired thermal and frequency range of operation of the engine. By way of nonlimiting example, the material of the rigid layer may be of the metallic or composite type and the material of the viscoelastic layer may be of the elastomer, rubber, silicone, polymer, glass or epoxy resin type.

Naming three as the number of layers is purely by way of indication, it being possible for this number to be greater, so long as there is a succession of rigid layers and of viscoelastic layers and that the outermost layers are made of rigid materials. The number of layers is defined as a function first of the space available and second of the rigidity and viscosity that the shim 7 is to be given in order to achieve the desired damping. Depending on the applications, the layers of viscoelastic materials and the layers of rigid materials may be of equal size or of different size. When the shim comprises several layers of viscoelastic materials these may all have the same mechanical properties or alternatively they may have different properties. Likewise, the layers of rigid materials may all have the same mechanical properties or alternatively may have different properties.

In FIG. 4, the layered material is subjected to a compressive stress for which there is no appreciable deformation. By contrast, in FIG. 5, the layered material is subjected to a shear stress and a lateral movement can be seen, the layer 9 of viscoelastic material deforming to allow its movement. The associated deformation allows some of the energy transmitted by the movement of the blade 5 to be dissipated, thus modifying the vibration modes of this blade.

Figure 7:
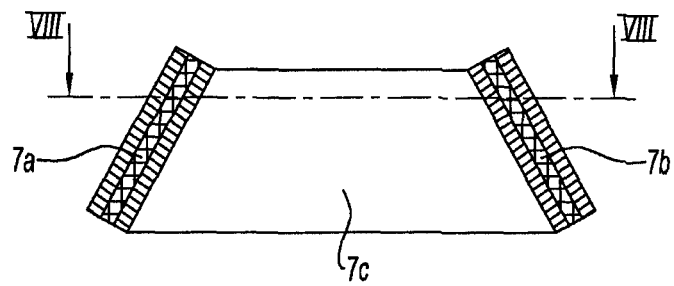
Figure 8:
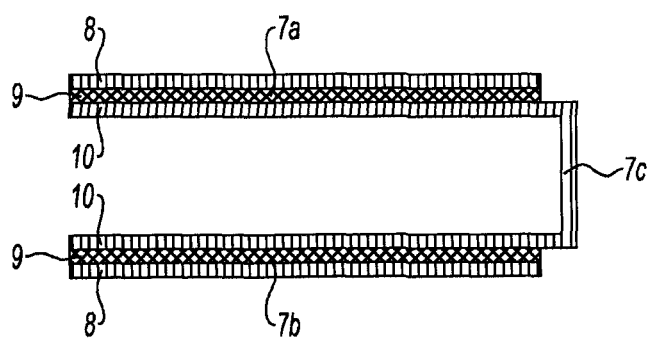

FIG. 6 shows one of the outermost layers of a shim according to the invention, before it is brought into shape, and which consists of a strip made up of three consecutive linear segments separated from one another by two fold lines 11 and 12. FIGS. 7 and 8 respectively show a front view and a view from above, in section on VIII, of a shim according to the invention after it has been bent along the fold lines 11 and 12. In the embodiment depicted, only the two outermost segments 7a and 7b of the shim have a layered structure, the third segment 7c, situated between the two fold lines 11 and 12, being produced as a single layer of rigid material, with no layering. For reasons concerned with simplifying production, the third segment 7c is produced in the continuity of the outermost layer 10 which is intended to be positioned on the inside of the fold. In another embodiment, the third segment 7c may be produced in the continuity of the outermost layer 8 which is intended to be positioned on the outside of the fold, or in the continuity of one of the intermediate layers of rigid material if the device includes such intermediate layers.

In this configuration the shim, when viewed from above, is substantially U-shaped, the two lateral branches 7a and 7b of the U, however being inclined with respect to the plane of symmetry of the U as a result of a rotation about a straight line parallel to this plane. The base of the U, which forms the bottom of the shim 7c, is perpendicular to this plane and is intended to join together the two lateral branches of the shim 7. It is intended to be positioned against the blade 5, at the upstream or downstream end of the root 6 thereof, with reference to the direction in which the air flows through the engine.

Figure 9:
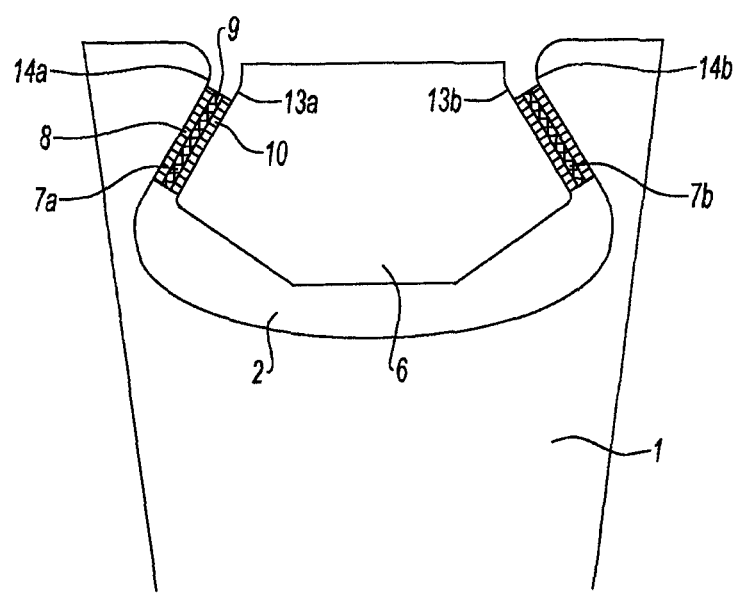
FIG. 9 is a view in cross section of the device for holding a blade via the cavity of a disk, with a shim according to one embodiment of the invention inserted between the cavity and the blade root.

FIG. 9 shows two parts of a shim 7, in position in a cavity 2 of a compressor disk 1. The two branches 7a and 7b are interposed between the upper walls 13a and 13b of the root 6 of the blade 5 and the retaining walls 14a and 14b of the cavity 2. Because of the flat shape of the layers of viscoelastic material and because they are held between flat layers of rigid material, these layers deform little under the effect of the compression due to the transmission of centrifugal forces from the blade to the retaining walls 14a and 14b. By contrast, they retain their ability to be deformed in the plane of the layers.

When the blades begin to rotate, the shim 7 is first compressed, because of the centrifugal force applied to the blade root 6 by the rotation of the compressor and secondly subjected to shear which is dependent on the angle that the retaining walls 14a and 14b make with the radial direction passing through the center of the cavity 2. Under this shear stress the viscoelastic layer 9 deforms and the rigid layers 10 of the two branches 7a and 7b which are in contact with the blade root 6 move radially outward. Once the engine speed has reached a constant value, and in the absence of any vibrational stress, the shim 7 remains stationary, in this deformed position.

Figure 10:
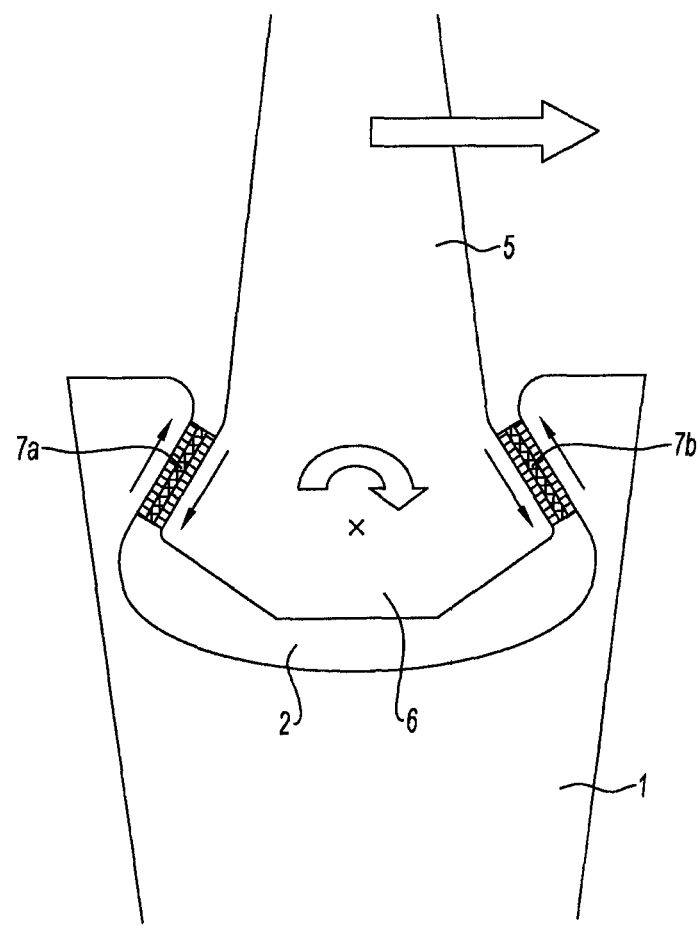
FIG. 10 is a view in cross section of a blade and of its root in position in the cavity of a disk, with a shim according to one embodiment of the invention, showing how load is transmitted and also showing the direction of the associated movements.

FIG. 10 shows the loadings to which the shim 7 is subjected during flexural vibration of the blade 5, that is to say movement thereof along the axis of rotation of the engine. The root 6 of blade 5 is driven in a rotational movement about an axis colinear with the central axis of the cavity 2 and additional shear forces are applied to the lateral branches 7a and 7b of the shim 7. If the blade 5 moves in the direction depicted in FIG. 10, the right-hand branch 7b will experience an increase in shear while the left-hand branch 7a will experience a reduction in shear. Next, the flexural vibration tends to cause the blade 5 to return in the opposite direction so the branch 7b then experiences a reduction in shear and the branch 7a an increase in shear. The back and forth movement that this flexing induces in the viscoelastic material causes vibrational energy to be dissipated and generates the desired damping effect.

It will be noted that the positioning of the shim bottom 7c prevents this shim from interfering with the movements of the lateral branches 7a and 7b and that parasitic tensions arise in these branches if the shim bottom comes into contact either with the root 6 of the blade or with the bottom of the cavity 2.

Although the invention has been described in conjunction with one particular embodiment, it is quite clear that it covers all technical equivalents of the means described and combinations thereof where these fall within the scope of the invention.

The invention claimed is:

1. A vibration damping device for a turbomachine blade including an airfoil and with a blade root configured to be inserted in a cavity in a disk supporting a bladed rotor, the device being configured to be positioned between the blade root and a wall of the root retaining cavity, at a region of contact that occurs in operation between the blade root and the cavity, the device comprising:
    at least one shim including an assembly of layers of rigid materials and of viscoelastic materials, at least one layer of viscoelastic material being positioned between two layers of rigid materials,
    the shim comprising two parts, each part forming a lateral branch that can be inserted along one of two retaining walls, the two lateral branches being joined together, to form a single component, by a third part of rigid material that forms the shim bottom,
    wherein the shim bottom is positioned, relative to the lateral branches, such that after fitting the shim bottom abuts an upstream or downstream end of the blade root, and
    wherein the shim is obtained from a flat component of three consecutive segments separated from one another by fold lines, the segment that forms the shim bottom being positioned between the two segments that form the lateral branches so as to present a substantially U-shape when viewed from above in which the lateral branches extend along a first direction, the shim bottom extends along a second direction substantially perpendicular to the first direction, and a length of the lateral branches in the first direction is greater than a length of the shim bottom in the second direction.

2. The vibration damping device as claimed in claim 1, wherein the shim includes an assembly of an odd number of layers equal to or greater than 3, the layers of viscoelastic materials alternately succeeding the layers of rigid materials and outermost layers are made of rigid materials.

3. The vibration damping device as claimed in claim 2, wherein characteristics of the viscoelastic material vary from one layer to another.

4. The vibration damping device as claimed in claim 1, wherein characteristics of the rigid material vary from one layer to another.

5. The vibration damping device as claimed in claim 1, wherein the shim bottom forms a single piece with one of the layers of rigid materials of the lateral branches.

6. A turbomachine comprising at least one disk supporting a bladed rotor, the blade roots of which are inserted in cavities of a disk through insertion of a vibration damping device as claimed in claim 1.

7. A gas turbine engine comprising a fan, a disk of a fan stage of which comprises a device as claimed in claim 1.

8. A propfan engine of which a disk of at least one of stages that carries unducted fans comprises a device as claimed in claim 1.

9. The vibration damping device as claimed in claim 1, wherein the lateral branches are inclined with respect to a plane of symmetry of the U, and the shim bottom forms the base of the U which is perpendicular to the plane of symmetry.

* * * * *